United States Patent [19]

Vykukal

[11] Patent Number: 4,598,428
[45] Date of Patent: Jul. 8, 1986

[54] SHOULDER AND HIP JOINTS FOR HARD SPACE SUITS AND THE LIKE

[75] Inventor: Hubert C. Vykukal, Los Altos, Calif.

[73] Assignee: The United States of America as represented by the Administrator of the National Aeronautics and Space Administration, Washington, D.C.

[21] Appl. No.: 642,602

[22] Filed: Aug. 20, 1984

[51] Int. Cl.⁴ .................. A62B 17/00; B63C 11/04
[52] U.S. Cl. .................. 2/2.1 A; 285/168; 285/184; 285/227; 138/120; 403/164
[58] Field of Search .................. 2/2.1 A, 2.1 R; 128/202.11; 285/168, 177, 179, 181, 182, 184, 227, 235, 276; 138/120, 155; 414/1, 5, 7, 8; 403/164, 165, 78

[56] References Cited

U.S. PATENT DOCUMENTS

| | | | |
|---|---|---|---|
| Re. 8,885 | 9/1879 | Henis | 285/184 |
| 512,558 | 1/1894 | Landis | 406/164 |
| 1,726,531 | 9/1929 | Andel | 165/41 |
| 2,501,217 | 3/1950 | Hawn | 464/114 |
| 2,861,701 | 11/1958 | Bergsland | 414/728 |
| 3,289,485 | 12/1966 | Cazalis et al. | 74/18.2 |
| 3,405,406 | 10/1968 | Vykukal | 128/202.11 X |
| 3,456,812 | 7/1969 | Gandolfo | 414/8 |
| 3,625,378 | 12/1971 | Attiz | 414/8 |
| 3,712,481 | 1/1973 | Harwood | 74/469 X |
| 4,151,612 | 5/1979 | Vykukal | 2/2.1 A |
| 4,369,814 | 1/1983 | Humphrey | 138/120 |

Primary Examiner—Peter Nerbun
Attorney, Agent, or Firm—Darrell G. Brekke; John R. Manning; Robert D. Marchant

[57] ABSTRACT

For use in hard space suits and the like, a joint between the torso covering and the upper arm covering (i.e., shoulder) or between the torso covering and upper leg covering (i.e., hip) is disclosed. Each joint has an outer covering and a inner covering. The outer covering has plural preferably truncated toroidal sections decreasing in size proceeding outwardly. In one embodiment at each joint there are two bearings, the first larger than the second. The outer race of the larger bearing is attached to the outer edge of the smaller end of each section and the inner race of the larger bearing is attached to the end wall. The inner race of the smaller bearing is attached to the end wall. The outer race of the smaller bearing is attached to the larger end of the next section. Each bearing has appropriate seals. Between each section is a rubber ring for the comfort of the wearer. Such rubber rings have radial flanges attached to the inner races of two adjacent bearings. Matching semicircular grooves are formed in the abutting overlapping surfaces. Bellows-like inner walls are also provided for each section fixed at one end to an inner cylindrical flange and, at the opposite end, to an end wall. Each outer section may rotate 360° relative to the next outer section, whereas the bellows sections do not rotate, but rather expand or contract locally as the rigid sections rotate relative to each other.

40 Claims, 11 Drawing Figures

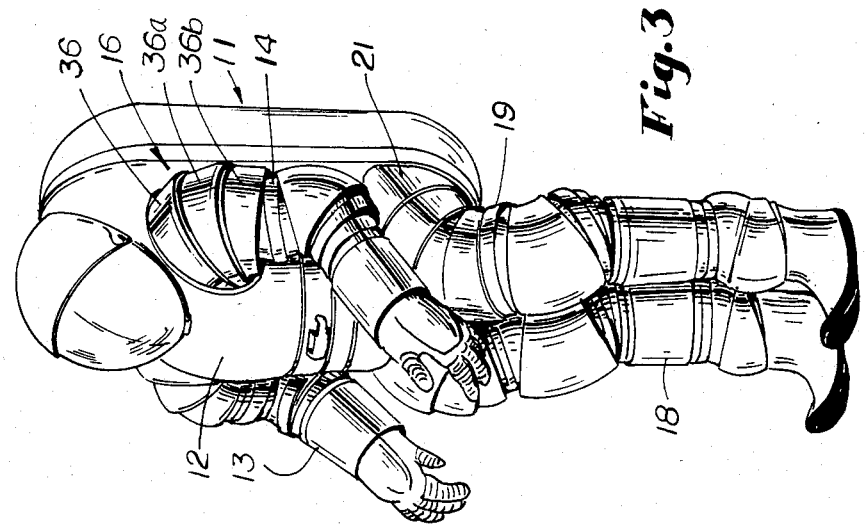
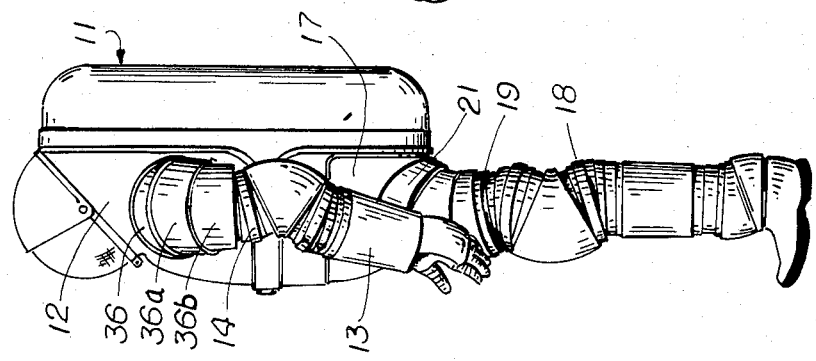
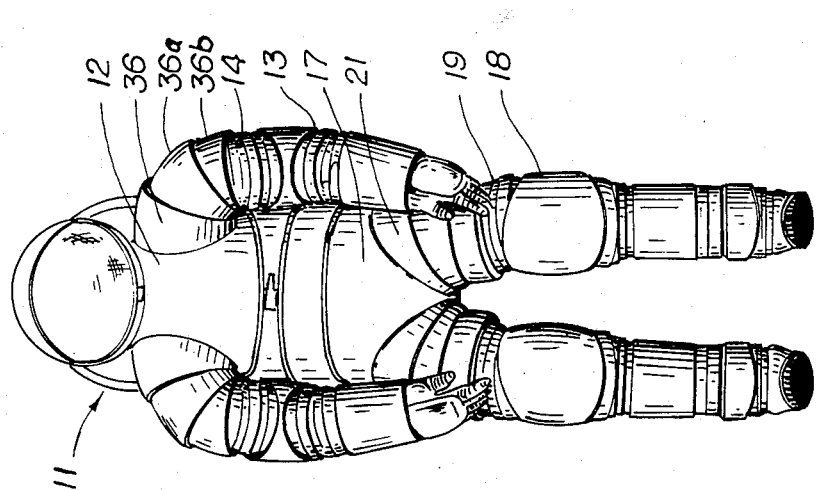

SHOULDER AND HIP JOINTS FOR HARD SPACE SUITS AND THE LIKE

ORIGIN OF THE INVENTION

The invention described herein was made by an employee of the U.S. Government and may be manufactured and used by and for the Government for governmental purposes without the payment of any royalties thereon or therefor.

BACKGROUND OF THE INVENTION

1. Field of the Invention

This invention relates to joints, especially at the shoulder or hip, of hard space suits. It may also be used on diving suits, manipulator arms, user-occupied arms for penetrating boxes such as autoclaves, high-vacuum boxes for integrated circuit work and the like, and to cover and isolate articulated torque drives which require protection from hostile environments. The joint has an outer covering of a relatively rigid material comprising plural sections which may rotate relative to each other through 360° while maintaining an airtight seal. In the preferred embodiment, there are also inner covering sections of flexible material such as bellows, corresponding to at least some outer covering sections which do not rotate relative to each other.

2. Description of Prior Art

A description of prior art is set forth in U.S. Pat. No. 4,091,464. The present invention distinguishes over the prior art listed therein and from U.S. Pat. No. 4,091,464 in a number of respects. The named reference shows sections of flexible fabric connected at joints whereby larger dimensioned sections are joined to sections of smaller dimensions. The joints pivot about axes. Each joint has a ball bearing having inner and outer races, the outer race being fixed to the larger section and the inner race being fixed to the smaller section. The construction of the joints of this reference, however, result in considerable friction resisting relative movement.

U.S. Pat. No. 3,782,481 shows a continuous bellows outer layer which provides a hermetic seal plus two inner layers, each of which comprises alternate rigid cylindrical wedges and bellows. The innermost and next innermost layers alternate—i.e., if there is a bellows section at one portion of the innermost layer, which is always encircled by a cylindrical wedge section of the next innermost layer. Since the two inner layers must be able to transmit torque from one end to the other, the wedge sections of these inner layers cannot rotate independently of adjacent bellows sections. This feature of U.S. Pat. No. 3,782,481 makes the device unsuitable for a rotary joint which is user-moved since the user would find his region of motion severely restricted. The reference, therefore, used a drive motor, the use of which is unnecessary and, in fact, highly undesirable in the present invention. A further principal distinction between the present invention and this reference is that the sections of the present invention may rotate independently of each other.

OBJECT OF THE INVENTION

The present invention has for its principal object to provide a double-walled joint for use in the environments heretofore mentioned. The outer wall is of a hard construction, such as rigid plastic or metal, and consists of plural truncated toroidal sections. The inner layer is preferably of a bellows material.

The outer layer, being of a rigid material, is constructed so that it is possible to turn each section independently of the other, clockwise or counter-clockwise, and through 360°. In addition, the outer layer protects the bellows from damage. The spacing of the two layers may be varied and another material introduced therebetween. The material may function as an insulator or a radiation shield, and it will also be protected by an outer layer.

A further feature of the invention is that the bellows sections do not rotate as the outer sections rotate, although they may expand and contract in localized areas to accommodate rotation of the sections of the outer layer. The fact that the bellows do not rotate is important inasmuch as these sections are closest to the user and there is no relative rotation between the inner layer and the arm or leg of the user.

A further feature of the invention is to provide an improved seal between the outer sections resulting in less friction resisting movement. Prior joints utilizing interconnected rotatable joints, such as those disclosed in U.S. Pat. No. 3,363,564 require seals with a wiper action. The friction inherent in such wiper-action seals is avoided in the present invention.

The fact that each outer section may rotate relative to the next section through 360° independently of rotation of any other section is of particular advantage. As the outer sections rotate, the inner bellows sections expand and contract locally—i.e., the portion of the bellows over the outer arm may expand while the portion of the bellows over the inner arm may contract.

A still further feature of the invention is the fact that the outer layer sections may be readily detached as required. The joints of the outer layer use ball bearings, the races of which are overlapped by flanges which are part of the outer layer sections. Matching grooves in the races and flanges are filled with a wire which may be inserted through a slot in one location. When the wires are in place in the grooves, they prevent disassembly. Other overlapping members are similarly detachably secured together by wires.

A tool is provided for ready insertion and removal of wires from the grooves through the aforementioned slot.

SUMMARY OF THE INVENTION

The foregoing and other objects and advantages are achieved through the use of an outer layer of rigid material consisting of plural truncated toroidal sections of progressively diminishing dimensions interconnected by circular end walls. Between spaced, parallel cylindrical flanges on the ends of the outer layer sections and on the end walls are interposed bearings, such as ball bearings, which permit the outer layer sections to rotate 360° relative to each other and relative to the stationary end walls. Corresponding sections of the inner layer, preferably of bellows-like material, are held stationary relative to the outer layers, the opposite ends of the bellows-like material being attached to annular flanges which rotate with the inner races of the bearings.

IN THE DRAWINGS

FIG. 1 is a front elevational view of a space suit in which the present invention may be used;

FIG. 2 is a side elevational view thereof;

FIG. 3 is a perspective view thereof;

DETAILED DESCRIPTION OF PREFERRED EMBODIMENTS

Figure 4:
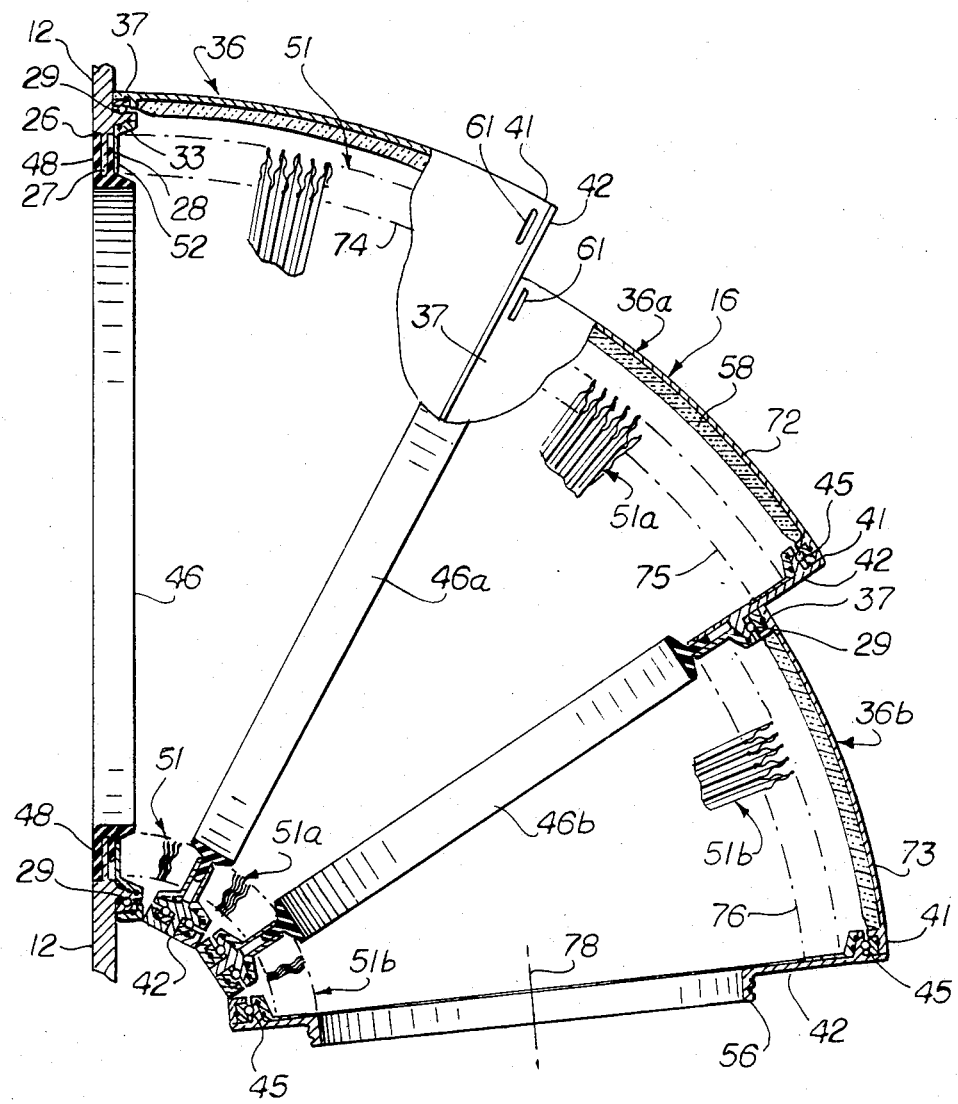
FIG. 4 is an enlarged sectional view of a shoulder joint of the space suit.

FIGS. 1-3 illustrate a typical use for which the present invention is intended, namely, a space suit 11. The details of the space suit form no part of the present invention and considerable variation in structure may be made. As previously set forth, the invention is not confined to usage in space suits. The particular space suit 11 shown in the drawings has an upper torso section 12 to which is connected a pair of arms 13, each arm 13 having an upper arm 14 which is attached to the upper torso section 12 through a shoulder joint 16, the details of which form a preferred embodiment of the present invention. The space suit 11 also has a lower torso section from which extend legs 18, each having an upper leg 19. Hip joints 21 connect upper leg 19 to the lower torso section 17. Although not illustrated in detail, the hip joint 21 is a second preferred usage of the present invention.

Figure 5:
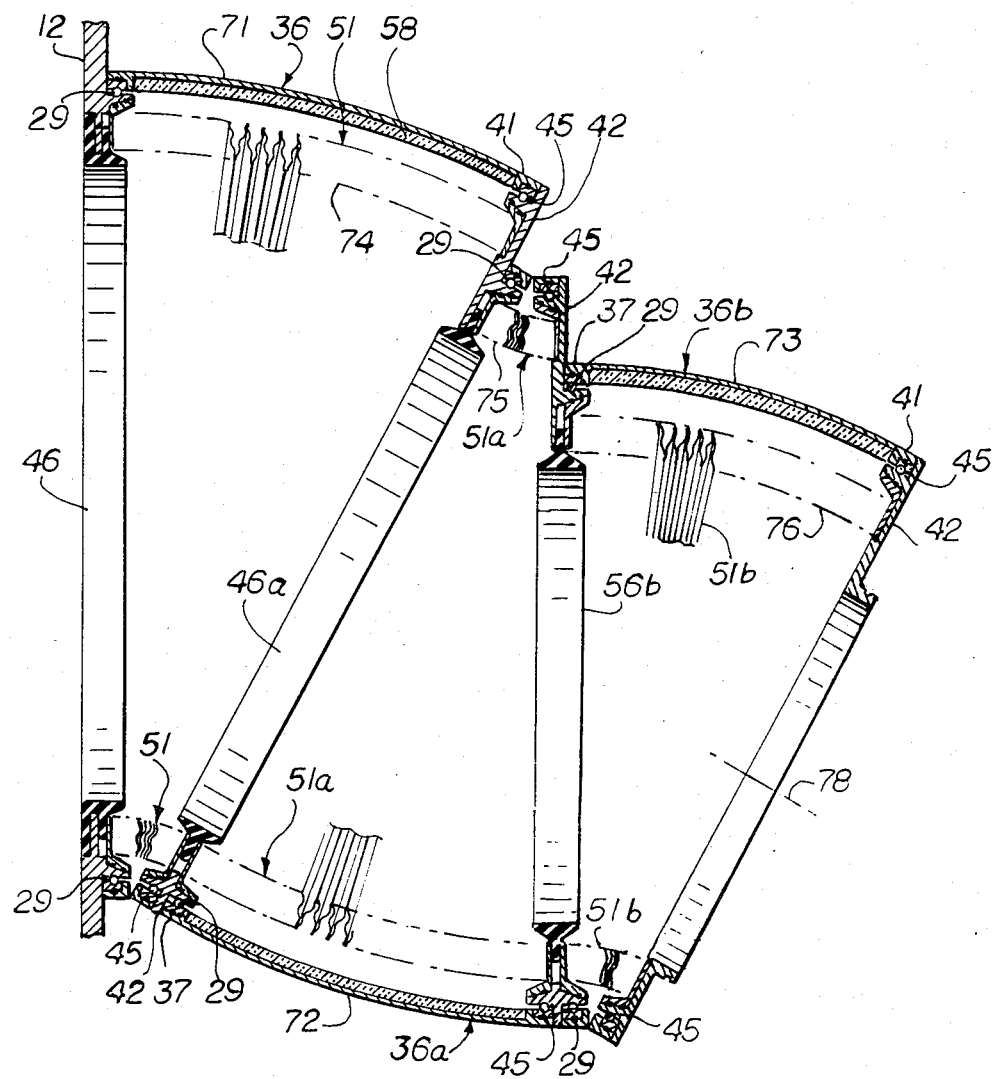
FIG. 5 is a view similar to FIG. 4 showing the middle section of the outer covering of the suit turned 180° from the position thereof in FIG. 4.
Figure 6:
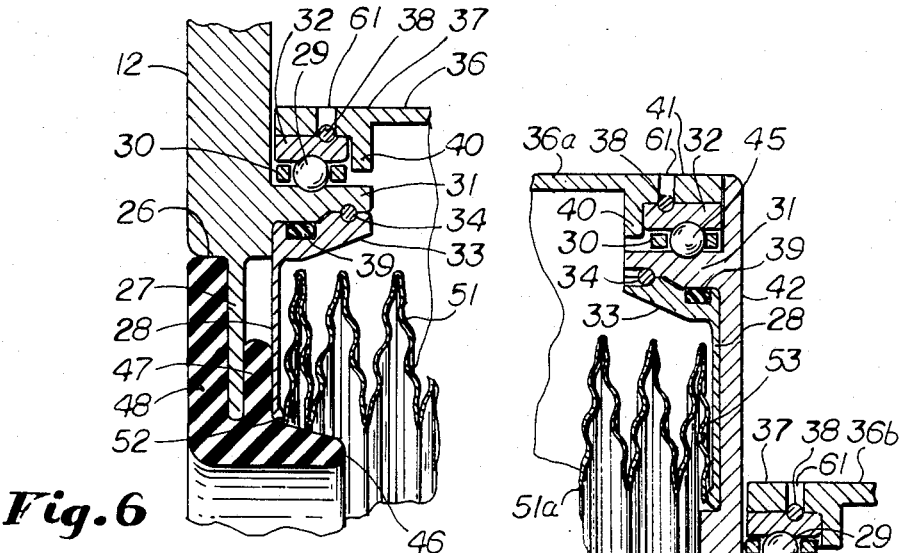
FIG. 6 is a further enlarged sectional view of a portion of FIG. 4.

Directing attention now to FIGS. 4, 5 and 6, upper torso section 12 has a circular opening 26 from which extends a thin, radially inwardly directed flange 27. Spaced outwardly from and parallel to flange 27 is radially inwardly directly flange 28 which is independent of flange 27. Outwardly of opening 26 is ball bearing 29, the inner race 31 of which is either integral with or otherwise fixed to torso section 12. Bearing 29 has an outer race 32 and a ball cage 30. Second flange 28 has a peripheral outward extension 33 which is detachably connected to inner race 31 by wire 34, inserted in matching oppositely facing grooves in members 31,33. As is apparent from FIG. 6, when wire 34 is in place, extension 33 and flange 28 may not be separated from the inner race 31, but when the wire 34 is removed, the parts are capable of disassembly. The means whereby wire 34 is inserted and withdrawn as hereinafter set forth.

The shoulder joint 16, as best shown in FIG. 4, has three articulately connected outer wall sections 36, 36a and 36b of diminishing size. It will be understood that fewer or more sections 36 may be employed. Each such section is a truncated toroidal section formed of a relatively hard material such as a rigid plastic or metal. The end of each section 36, 36a, 36b is circular and lie on converging planes. The included angle between the planes is a matter of choice, as is the number of sections. Integral with or welded to the upper end of section 36 is an upper cylindrical flange 37 which fits outside outer race 32 and is held in assembled condition by a second wire joint 38 fitting into mating opposed semicircular grooves in a manner similar to the joint 34. Short radial flanges 40 rigidify the ends of sections 36 and insure proper alignment with bearings 29. Such flanges 40 are used throughout the construction.

At the outer end of section 36 is an integral or separate lower cylindrical flange 41. Because the sections 36, 36a, 36b have graduated diameters, a wall 42 is used between adjacent sections. As shown clearly in FIG. 7, the wall 42 only extends from the edge of the outer toroidal section to the inner ball bearing 29. Thus each wall 42 has an eccentric aperture and that aperture is concentric with ball bearing 29. FIG. 8 is a detailed view of a section 36 wherein ball bearings 29 and 45 are in close proximity as at the armpit.

There are, in the structures shown in FIGS. 4 and 5, three end walls 42, each of progressively smaller size. Each end wall 42 has an outwardly extending cylindrical flange 43 which constitutes or is fixed to the inner race of bearing 29. Each end wall 42 also has an upward extending cylindrical flange 31, (best shown in FIG. 7) which constitutes or is attached to the inner race of ball bearing 45. Each annular flange 28 has an extension 33. Extension 33 is contiguous to each ball bearing joint 29, 45 and the inner race of each ball bearing is attached to an extension 33 by a wire. See also FIG. 10.

For each joint, there is a comfort ring 46, 46a, 46b of rubber or rubber-like material. Each ring 46 has a central radial flange 47 which fits between flange 28 and its opposed annular flange. In those instances where the wall 42 is involved (as in FIG. 7) comfort ring flange 47 is sandwiched between flange 28 and 49. In the structure shown in FIG. 6, the flange 47 is positioned between flange 27 and flange 28. Further, in the specific structure of FIG. 6, the comfort ring 46 has a second and larger-diameter outward-directed annular flange 48 parallel to and spaced from flange 47. Flanges 47 and 48 of comfort ring 46 straddle flange 27. The comfort rings 46, 46a, 46b protect the joint user from chafing against the edges of flanges 27, 28 and 49. The comfort rings can be readily extricated from flanges 27, 28 and 29 if it is desirable to replace or thoroughly clean the rings. As the rings are made of a rubber-like material they can be removed from and returned to flanges 27, 28 and 49 by the use of motions that simultaneously twist and distort the rings.

Metallic bellows sections 51, 51a, 51b are positioned within each outer section 36, 36a, and 36b. The upper end 52 of each section 51 is fixed to flange 28 and the lower end 53 of such section is fixed to the corresponding flange 28 at the opposite end. Welding, brazing, various adhesives and the like may be used to connect the bellows ends 52, 53 to the flanges 28. These connections and O-rings 39 hermetically seal the interior of the joint.

A terminal flange 56 is integral with or connected to wall 42 of the lowermost section of the joint (see FIGS. 4 and 5), that is, the section most remote from the torso section 12, and is the means whereby the upper arm section 14 of the space suit is connected to the shoulder joint 16.

The space between the bellows section 51 and outer wall section 36 may be entirely or partially filled with thermal insulation or radiation shielding 58, if required. The shielding may be attached to the insides of sections 36, 36a, 36b by adhesives or other means.

Directing attention now to FIGS. 4 and 5, it will be seen that the upper wall section 36 is coupled to the torso 12 by means of the first bearing 29. Thus, section 16 may rotate in two directions relative to torso 12 by any angular amount. That is, section 36 may rotate more than or less than a revolution in a clockwise or counter-clockwise direction relative to torso 12. Bellows section 51 never rotates with respect to torso 12. O-ring 39 and wire 34 prevent relative motion between inner race 31 and extension 33 of flange 28. As bellows 51 is connected to flange 28, bellows 51 cannot rotate with respect to inner race 31 (which is integral with or connected to torso 12). It is to be understood that when section 36 is rotated, wires 38, and portions of bearings 29 and 45 (the outer races, balls and cages) move in unison therewith. Section 36a is free to rotate relative to section 36 (or section 36b) in a manner similar to that in which section 36 may rotate relative to torso 12. When section 36a is rotated, a portion of bearings 29 and 45 rotate in unison therewith, along with associated wires 38 and 34. Bellows 51a does not rotate in unison with section 36a. Bellows 51b may not rotate relative to bellows 51a, bellows 51a may not rotate relative to bellows 51, and bellows 51 may not rotate in respect to torso 12. Section 36a is free to rotate in a clockwise or counter-clockwise direction relative to section 36 or section 36b in any angular amount (less than or more than a revolution). Similarly, section 36b, having bearings 29 and 45 associated therewith, may rotate in a clockwise or counter-clockwise direction any angular amount relative to section 36a.

From a rotational standpoint, each bellows section remains relatively stationary with respect to torso section 12. That is, no bellows section may rotate with respect to torso section 12. When a section 36 is rotated, the bellows section associated therewith undergoes a dynamic compression-expansion modification. For example, focusing on the joint section adjacent to torso section 12, bellows 51 always experiences a maximum expansion adjacent the portion of section 36 that has the largest displacement between bearings 29 and 45 (call that dimension $Y_{max}$) and the maximum compression at a location removed 180° (the place where bearings 29 and 45 are closest to each other). Thus, a section 36 is rotated and the portion of the section with dimension $Y_{max}$ is rotated, the bellows maximum expansion region tracks the $Y_{max}$ portion, and the bellows maximum compression region follows behind by 180°.

The two ball bearings associated with each section 36, 36a and 36b have the same diameter. The ball bearings for section 36a are larger than those for section 36b and the bearings for section 36 are larger than those for section 36a. Accordingly, ball bearing 45 in FIG. 7 has a larger diameter than ball bearing 29. It will be understood that end wall 42 is circular with a center concentric with the center of outer ball bearing 45; the aperture in end wall 42 is circular and its center is concentric with the center of inner bearing 29; and that the aperture center is offset from the center of end wall 42. The adjacent ends of bellows sections 51 and 51a are effectively fixed to opposite sides of an end wall 42 and likewise adjacent ends of bellows 51a and bellows 51b are effectively fixed to opposite sides of a second end wall 42. The end of bellows section 51 inside of bearing 29 is effectively fixed to torso section 12. Thus, ignoring bellows compression and expansion motions, the bellows sections 51, 51a, 51b and end walls 42 remain relatively stationary while one or more sections 36, 36a, 36b revolve.

FIGS. 4 and 5 show joint 16 in different positions. Section 36 is in the same position in both figures. FIGS. 4 and 5 depict a 180° rotational change in section 36a with respect to section 36. It will be understood that the relative rotation of the section is merely by way of illustration and that any one of the sections may rotate any number of degrees relative to adjacent section. In FIG. 4 segment 71 of section 36 is adjacent segment 72 of section 36a, and segment 72 is adjacent to segment 73 of section 36b. Also in FIG. 4, section segment 71 is adjacent bellows segment 74, section segment 72 is adjacent bellows segment 73, and section segment 73 is adjacent bellows segment 76. In FIG. 5, section 36a is rotated 180 degrees with respect to section 36 and to section 36b. Note that section segment 71 is still adjacent to bellows segment 74 and section segment 73 is still adjacent to bellows segment 76; however, section segment 72 is now removed 180 degrees from bellows segment 75 and bellows segment 75 is more compressed than it is in FIG. 4. In FIG. 4 bellows segments 74-76 are each at limits of maximum expansion whereas in FIG. 5 bellows segment 75 is in a compression limit. Bellows segment 75 is in a compression limit in FIG. 5 inasmuch as section 36a was rotated so as to bring the narrowest portion adjacent to bellows segment 75. FIGS. 4 and 5 show that bellows section 51a does not rotate when section 36a is rotated. When section 36 is rotated with respect to torso section 12, bellows section 51 is not rotated. Likewise, when section 36b is rotated with respect to section 36a, bellows section 51b is not rotated. From a rotational standpoint, bellows sections 51, 51a, 51b are effectively tied to torso section 12. The rotation of sections 36, 36a and 36b does not affect the hermetic seal existing between the interior and exterior of the joint. The relative rotation of sections 36, 36a, 36b does not require any manipulation either manually by the user or by a motor. The movement of the user as he moves his arm around the shoulder joint is all that is required to cause the various sections 36, 36a, 36b to move, and very little user energy is required as a result of ball bearings 29 and 45. No energy is required to overcome the friction of wiping-type seals as none are utilized in the joint.

Axis 78 represents the longitudinal axis of terminal flange 56 (see FIG. 5). It is to be understood that rotation of sections 36, 36a, 36b will cause manipulation of the axis. Rotation of sections 36, 36a, 36b will cause manipulation of the axis. Rotation of sections 36, 36a and 36b will enable axis 78 to occupy any position in a cone or a hemisphere. The limits of excursion of axis 78 will depend on the number of sections 36 employed in the joint and the included angle of the toroidal segment represented by each section. The parameters can be selected so that the joint will provide the user unlimited freedom of motion.

Figure 9:
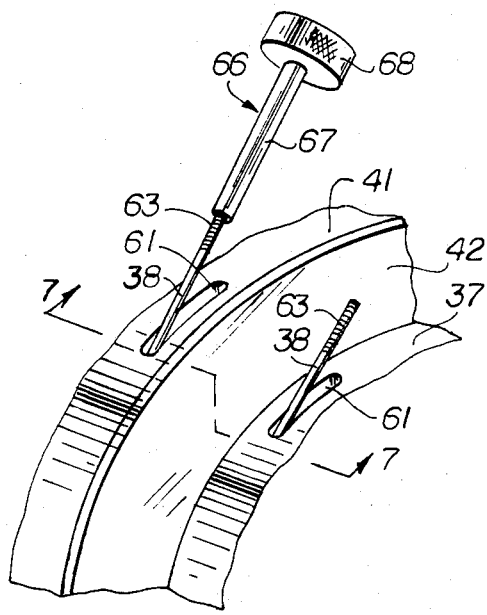
FIG. 9 is an enlarged fragmentary perspective view showing use of a tool to insert retaining wires in one of the joints of FIG. 1.

Wires 38 are employed to secure certain bearing races to adjacent flanges. Directing attention to FIG. 7, a wire 38 is positioned in two mating semicircular grooves and is used to secure flange 41 to race 32. A second wire 38 is employed to fasten flange 37 to the outer race of bearing 29. Similarly, wires 34 are used to secure certain flanges to adjacent flanges. For example, in FIG. 7 wire 34 is utilized to secure flange 33 to flange 43. FIG. 9 is an enlarged fragmentory perspective view of a portion of sections 36a and 36b illustrating the insertion of the wires 38 that are also depicted in FIG.

7. As shown in FIG. 9, at one convenient location, a slot 61 is formed in flange 41 for insertion and removal of wire 38. To facilitate insertion and removal, the upper end 63 of wire 38 is threaded. Tool 66 is provided with an internally threaded stem 67 and knob 68. The thread in stem 67 meshes with the thread 63. Hence, by turning the knob 68, the tool 66 may be connected to the end of wire 38. This makes a convenient means for either inserting or removing the wire 38. Although the number and locations of the wires vary throughout the structure heretofore described, the same tool and principle for removal and insertion may be used.

Figure 7:
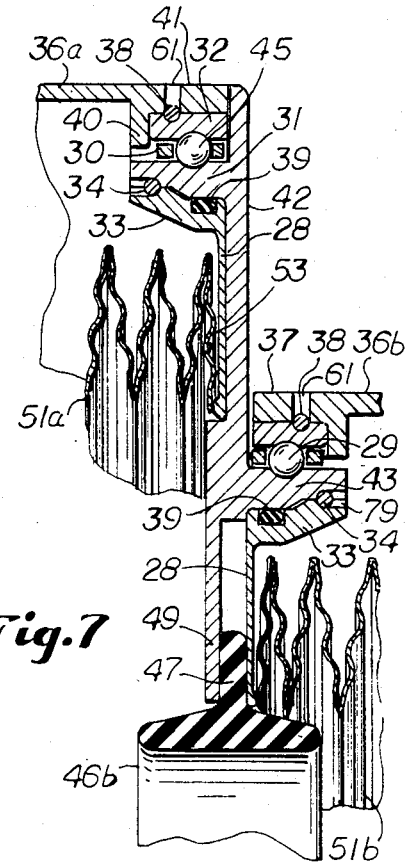
FIG. 7 is a further enlarged sectional view of another portion of FIG. 4.
Figure 8:
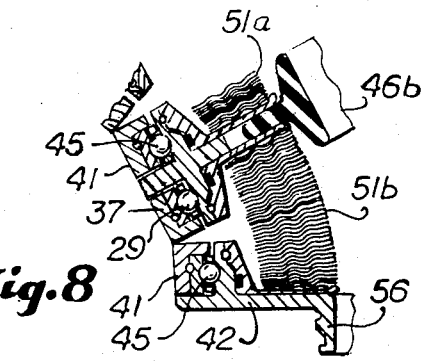
FIG. 8 is an enlarged sectional view of a portion of FIG. 4.
Figure 10:
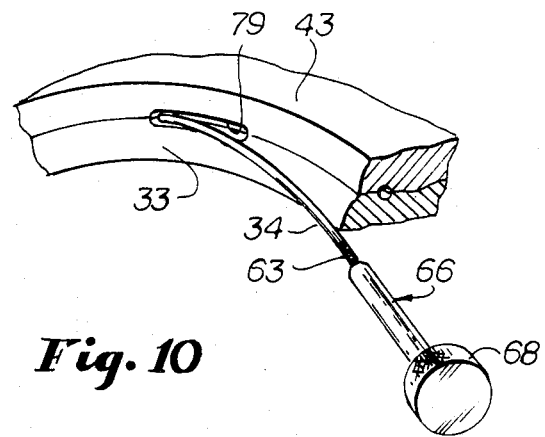
FIG. 10 is an enlarged fragmentary perspective view depicting the employment of still another retaining wire.

FIG. 10 illustrates a means to detachably secure the flanges 33 and 43 shown in FIG. 7. Slot 79 is located in the end edges of these two flanges. Wire 34 fits in mating grooves in both flanges to secure the overlapping parts together.

Figure 11:
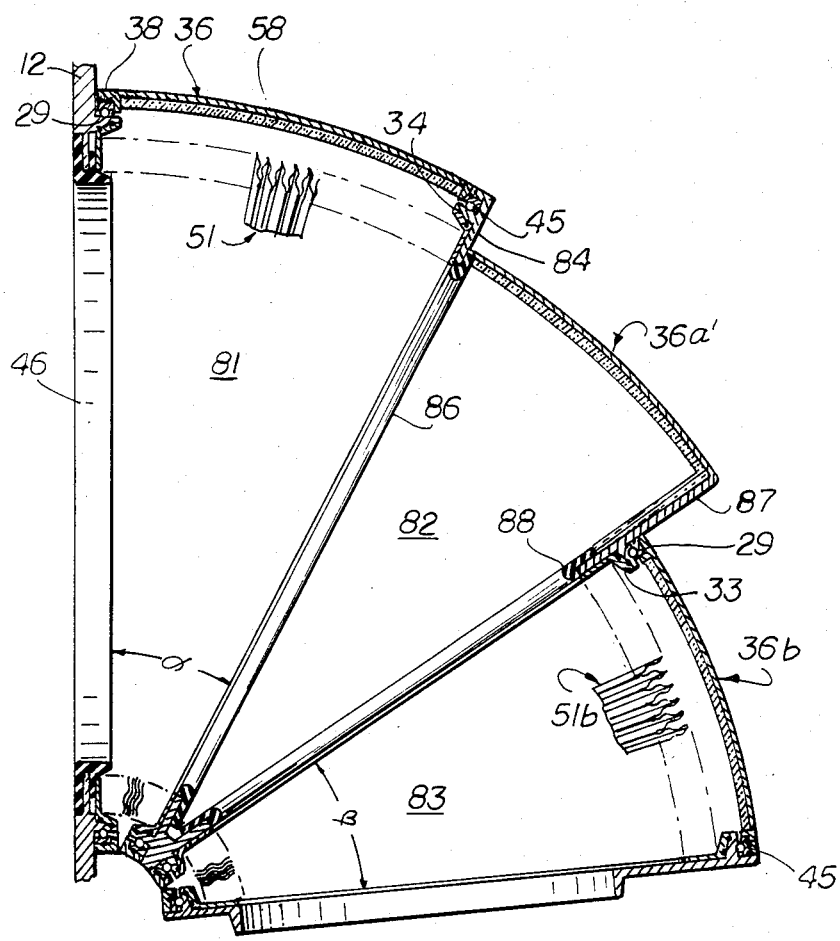
FIG. 11 is a sectional view of another embodiment of an articulated joint.

FIG. 11 is a sectional view of another embodiment of an articulated joint. Although depicted as a shoulder joint, it is to be understood that a similar joint could be used for a hip joint or another joint on a pressurized hard suit. The outer joint sections, 81 and 83, are very similar to the outer sections of the first embodiment. Each outer wall section 36, 36a' and 36b is a truncated toroidal section formed of a relatively hard material such as a rigid plastic or metal. The sections progressively decrease in diameter from 36 to 36b. Sections 36 and 36b are each supported by ball bearings 29 and 45. Wall section 36a' is not supported by ball bearings and it is not lined with a cylindrical bellows similar to bellows 51 and 51b. Joint section 81 has a circular end wall 84 with an eccentric annular aperture. A resilient comfort ring 86 covers the edge of the aperture. Joint section 82 has a circular end wall 87 with an eccentric annular aperture protected by a comfort ring 88. Outer wall section 36a' is integral with or connected to end walls 84 and 87. A hermetic seal is maintained between the interior and exterior of the joint without the need of a bellows in joint section 82. Section 36a' is not free to rotate with respect to bellows 51 or bellows 51b. The inner race of bearing 45 in section 81 is part of wall 84 and bellows 51 is fastened to the inner race by means of a wire 34 and flange 33. Similarly, the inner race of bearing 29 in section 83 is part of wall 87 and bellows 51b is fastened to the inner race by means of a wire 34 and a flange 33. Thus, bellows 51b, section 36a', and bellows 51 are interconnected and fastened to upper torso section 12. Wall section 36 may rotate with respect to torso 12 or section 36a' in either direction any angular amount. Section 36b may rotate with respect to section 36a' clockwise or counterclockwise any angular amount.

Inasmuch as the joint of FIG. 11 only has two rotatable sections, the use of the joint does not have quite as much freedom of motion as the use of the joint in FIG. 4. It is understood that the included angles of toroidal sections 36, 36a' and 36b need not be identical. The range of motion of the user of the joint can be increased by increasing angles and of sections 81 and 83, respectively. In addition to using less parts than the FIG. 4 joint, the FIG. 11 joint has another advantage. The four ball bearings of the FIG. 11 joint occupy less armpit space of the user than the six ball bearings of the FIG. 4 joint. Thus, a user of small stature might prefer the FIG. 11 joint to the FIG. 4 joint.

What is claimed is:
1. An articulated joint comprising:
   a covering of adjacent first and second rigid sections,
   an end wall having oppositely directed first and second flanges,
   a first bearing having a first race fixed for rotation with one said flange and a second race fixed for rotation with another said flange,
   at least one said rigid section being rotatable relative to said end wall,
   an elastmeric comfort ring located within said first and second rigid sections and means securing said comfort ring substantially stationary relative to said end wall,
   a first flexible section within one said rigid section, and
   means sealing an end of said flexible section to one said race.

2. A device according to claim 1 in which said flexible section is an expansible bellows.

3. A device according to claim 2 in which said means comprises a radial flange to which said end of said flexible section is secured and an extension fixed to said race.

4. A device according to claim 2 in which radiation shielding is located in the space between said rigid section and said flexible section.

5. An articulated joint comprising
   a covering of adjacent first and second rigid sections,
   an end wall having oppositely directed first and second flanges,
   a first bearing having a first race fixed for rotation with an end of said first rigid section and a second race fixed for rotation with said first flange,
   a second bearing having a third race fixed for rotation with an end of said second rigid section and a fourth race fixed for rotation with said second flange,
   said first and second rigid sections being individually selectively rotatable relative to each other and relative to said end wall.

6. A device according to claim 5 which further comprises an elastomeric seal ring between said first and second rigid sections and means securing said ring substantially stationary relative to said end wall.

7. A device according to claim 5 which further comprises
   a first flexible section within said first rigid section,
   a second flexible section within said second rigid section,
   first seal means sealing an end of said first flexible section to said second race, and
   second seal means sealing an end of said second flexible section to said fourth race.

8. A device according to claim 7 in which each said flexible section is an expansible bellows.

9. A device according to claim 8 which said first seal means comprises a radial flange to which said end of said first flexible section is secured and an extension fixed to said second race.

10. A device according to claim 8 in which radiation shielding is located in the space between said rigid sections and said flexible sections.

11. A device according to claim 5 in which said second bearing is of smaller diameter than said first bearing.

12. A device according to claim 6 in which the axis of rotation of said second bearing is eccentric to the axis of rotation of said first bearing.

13. A device according to claim 12 in which the outer races of said first and second bearings intersect at one point.

14. A space suit comprising a device according to claim 1 and a torso section having an opening and means connecting the end of said section opposite said end wall to said torso section at said opening.

15. A space suit according to claim 14 in which said opening is round and said means comprises a second bearing having its inner race fixed for rotation with said torso section and its outer race fixed to said first rigid section.

16. A device according to claim 1 in which each said rigid section is a truncated toroidal section, the ends of said rigid sections lying on planes intersecting at the axis of the toroid.

17. A device according to claim 16 in which said second rigid section is substantially smaller than said first rigid section.

18. A device according to claim 1 in which said end wall is detachably connected to said first race, one flange being connected to an overlapping said first race, said one end flange and said first race having matching grooves and a removable wire in said grooves which when in place prevents disassembly of said first bearing from said first rigid section.

19. A device according to claim 18 in which said one flange has an exposed surface formed with an opening extending into said groove in said one end flange through which said wire may be inserted or removed.

20. A device according to claim 19 in which an end of said wire is threaded and which further comprises a tool having an internally threaded hollow stem engageable with said wire.

21. A device according to claim 1 in which said sections have two cylindrical overlapping members, said overlapping members having exposed ends and said ends being detachable from each other and being formed with matching opposed grooves spaced inwardly from said exposed ends, at least one said exposed end being formed with an opening extending inward to said grooves and a wire insertable in and removable from said grooves through said opening to secure and release said members.

22. A space suit comprising a torso section having an opening, a limb section and an articulated joint connected at a first end to said torso section at said opening and a second end to said limb section, said articulated joint comprising
a covering of adjacent first and second rigid sections,
an end wall having oppositely directed first and second flanges,
a first bearing having a first race fixed for rotation with one said flange and a second race fixed for rotation with another said flange,
at least one said rigid section being rotatable relative to said end wall,
an elastomeric comfort ring located within said first and second rigid sections and means securing said comfort ring substantially stationary relative to said end wall,
a first flexible section within one said rigid section, and
means sealing an end of said flexible section to one said race.

23. A device according to claim 22 in which said flexible section is an expansible bellows.

24. A device according to claim 23 in which said first means comprises a radial flange to which said end of said flexible section is secured and an extension fixed to said race.

25. A device according to claim 23 in which radiation shielding is located in the space between said rigid section and said flexible section.

26. A space suit comprising a torso section having an opening, a limb section and an articulated joint connected at a first end to said torso section at said opening and a second end to said limb section, said articulated joint comprising
a plurality of rigid sections joined end to end,
an end wall sealed to each of two adjacent rigid sections, each said end wall having oppositely directed first and second flanges,
a first bearing having a first race fixed for rotation with an end of a first said rigid section and a second race fixed for rotation with said first flange,
a second bearing having a third race fixed for rotation with an end of a second said rigid section and a fourth race fixed for rotation with said second flange,
said first and second rigid sections being individually selectively rotatable relative to each other and relative to said end wall.

27. A space suit according to claim 26 in which said joint further comprises,
a plurality of flexible sections, one said flexible section being within each said rigid section
first means sealing an end of a first flexible section to one said race, and
second means sealing an end of a second flexible section to another said second race.

28. A space suit according to claim 27 in which each said flexible section is an expandable bellows.

29. A space suit according to claim 28 in which said first means comprises a radial flange to which said end of said first flexible section is secured and an extension fixed to said second race.

30. A space suit according to claim 26 which further comprises an elastomeric seal ring between said first and second rigid sections and means securing said ring substantially stationary relative to said end wall.

31. A space suit according to claim 27 in which radiation shielding is located in the space between said rigid sections and said flexible sections.

32. A space suit according to claim 26 in which said second bearing is of smaller diameter than said first bearing.

33. A space suit according to claim 32 in which the axis of rotation of said second bearing is eccentric to the axis of said first bearing.

34. A space suit according to claim 33 in which the outer races of first and second bearings intersect at one point.

35. A space suit according to claim 26 in which each said rigid section is a truncated toroidal section, the ends of said rigid section lying on planes radial to the axis of the toroid.

36. A space suit according to claim 35 which said second rigid section is substantially smaller than said first rigid section.

37. A space suit according to claim 26 in which said first end section is detachable from said first race, said first end section having a third flange overlapping said first race, said third flange and said first race having matching grooves and a removable wire in said grooves preventing disassembly of said first bearing from said first rigid section.

38. A space suit according to claim 37 in which third flange has an exposed surface formed with an opening extending into said groove in said third flange through which said wire may be inserted and removed.

39. A space suit according to claim 38 in which an end of said wire is threaded and a tool having an internally threaded hollow stem engageable with said wire.

40. A space suit according to claim 26 in which said sections have two overlapping cylindrical members having exposed ends, said ends being detachable from each other said members being formed with matching opposed grooves spaced inwardly from said exposed ends, at least one exposed end being formed with an opening extending inward to said grooves, and a wire insertable in and removable from said grooves through said opening to secure and release said members.

* * * * *